United States Patent

[11] 3,586,786

[72] Inventor Robert W. Wolff
Lombard, Ill.
[21] Appl. No. 835,175
[22] Filed June 20, 1969
[45] Patented June 22, 1971
[73] Assignee Automatic Electric Laboratories, Inc.
Northlake, Ill.

[54] INTERLOCK FOR TWO ASYNCHRONOUS SYSTEMS
5 Claims, 3 Drawing Figs.

[52] U.S. Cl. .......... 179/18 FG
[51] Int. Cl. .......... H04q 3/18
[50] Field of Search .......... 179/18 E, 18 GF, 18 FF, 18 FG

*Primary Examiner*—William C. Cooper
*Attorneys*—Cyril A. Krenzer, K. Mullerheim and B. E. Franz ABSTRACT: A telephone switching system matrix arrangement having two originating markers available to serve lines calling for service. Those portions of the two markers responsive to a call for service are shown and include an enabling interlock circuit. A part of this circuit is located in each marker. This circuit consists of a modified ring counter having two flip-flops in each marker that are operated by that marker's clock. A decoding circuit in each marker is used to enable that marker upon the condition that only one of the two flip-flops is in the set condition.

PATENTED JUN 22 1971

3,586,786

SHEET 1 OF 2

INVENTOR
ROBERT W. WOLFF
BY Bernard E. Franz
ATTORNEY

INTERLOCK FOR TWO ASYNCHRONOUS SYSTEMS

BACKGROUND OF THE INVENTION

1. Field of the Invention

This invention relates to a system for selectively permitting either of two markers connected in parallel to a group of matrices, to respond to a call for service therefrom. The invention eliminates the risk of the two markers racing, and the consequent double assignment when the two markers get a simultaneous call for service from the same matrix.

2. Description of the Prior Art

U.S. Pat. No. 3,211,837 issued Oct. 12, 1965 discloses a telephone system comprising a switching network, a common control for the recording of subscriber-sent data, translation, routing and sending, and a pair of markers that operate independently for the switching matrix control, calling subscriber's lines scanning and supervision. This patent is hereby incorporated to show the environment of this invention. Further details of this marker may be found in U.S. Pat. No. 3,293,368.

In a line group stage, calling lines, in different line groups, have access through respective switching networks to a common group of registers; and in a selector stage calls in different selector groups have access to a common group of outlets in various levels to local terminating call equipment or outgoing trunks to other exchanges. In any case, several calls may be processed simultaneously by different markers, each marker handling one call at a time. In this referenced patent, the line groups are divided between the two markers. Each marker thus serves its associated line group matrices on an allotted basis, though it is capable of assuming the load of its associated marker. There are however disadvantages to this type of allotting of line groups to the markers, as for example where a marker operation becomes inconsistent, then during low traffic periods, a subscriber attempting to place a call would consistently be served by the same marker. Thus, it is preferable to have both markers capable of serving the entire group of subscribers at all times on an alternating basis. This will obviate the above-enumerated difficulty and will also serve to better exercise the markers.

Though this has been done in some prior art systems it has been attended by inefficiencies in the use of the markers. One such method used in the prior art has been to use fixed intervals during which each particular marker was to respond to calls for service. This did not remove the problem of a subscriber being served by the same marker during immediately repeated attempts at placing a call when the marker was malfunctioning.

Another method was to have the markers respond to alternate calls for service, with a processing marker maintaining the matrices busy until it had disconnected itself from them. This arrangement was also undesirable since it did not permit the other marker to enter the matrices until the first marker had completed its functions in the matrices.

It is accordingly a primary object of this invention to interlock two markers in such a manner that they will respond to requests for service from the matrices without racing.

It is another object of this invention to interlock two markers so that a marker may respond to a call for service before the other marker has completed the processing of an earlier call for service.

SUMMARY OF THE INVENTION

In accordance with the invention, an interlock to prevent simultaneous matrix assignment of two markers consists of a modified ring counter having two flip-flops in each marker. The flip-flops in a given marker run off that marker's clock. The clocks are not synchronized, but have approximately the same clock rate. Two decoders are provided, one for the first two stages and one for the second two stages. The decoders are arranged to produce an output indicative of that marker's turn to respond, only when the associated stages are in different states. That is, when one stage flip-flop is in a set state and the other is in a reset state. This combination only occurs once during the propagation of the set state along the flip-flop registers for each marker, further with the flip-flops in each marker being driven by that marker's clock, this combination occurs during a convenient time interval for that particular marker. To facilitate greater overlap in marker operations the line groups from which calls for service originate are divided into 10 groups, with each marker scanning these groups during its allotted interval and answering calls for service in groups not being worked with by the other marker.

BRIEF DESCRIPTION OF THE DRAWINGS

The above-mentioned and other features of the invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENT

When a subscriber lifts his handset closing his line loop, the line relay operates and places a negative battery potential through a resistor on the P lead associated with his inlet. A negative potential on any inlet P lead will feed through the matrix and appear at every C unit outlet P lead. The C unit outlet P leads are selected and connected to both originating markers. The CFS signals are read in each marker.

Figure 1:
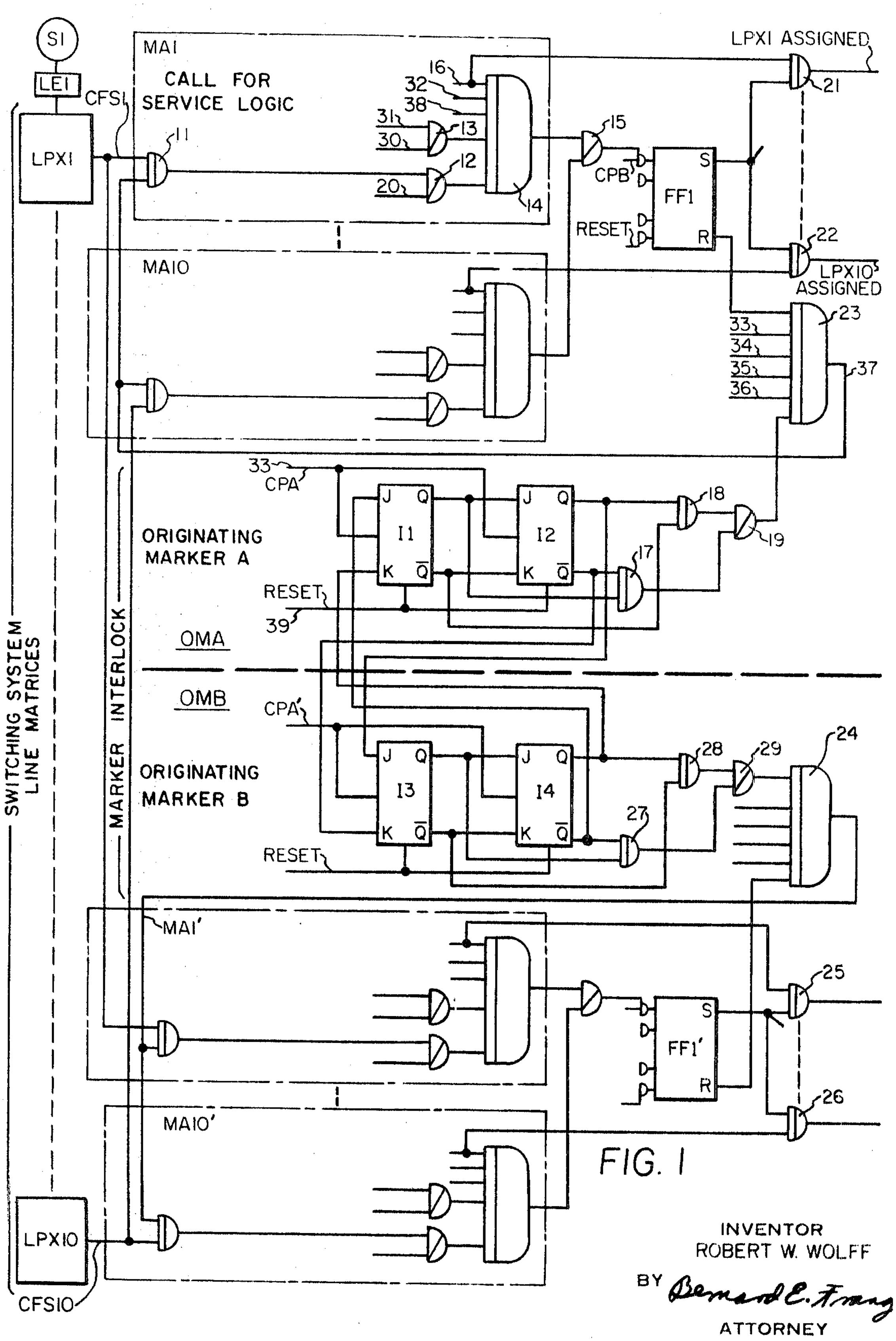
FIG. 1 shows in abbreviated form a series of 10 line matrices and two abbreviated markers including the marker interlock circuits.

Referring to FIG. 1 there may be seen two boxes labeled LPX1 and LPX10 joined by a dashed line. These boxes are each intended to represent a line group matrix, with the dashed line indicating the boxes that would be numbered 2 through 9, that are not shown. Each of these boxes has a call for service lead emerging from it that is labeled CFS1 through CFS10, corresponding to the group designations of the associated matrix. This lead is multiplied to both originating markers OMA and OMB, where it is terminated in a corresponding access circuit.

For a marker to assign itself to a CFS (Call For Service) several things must be true.

1. The marker scans the matrices, one at a time so the scanner or counter value must correspond to the matrix with a CFS.
2. The matrix must not be in use by either another OM Originating Marker) or TM (Terminating Marker).
3. The matrix must not be reserved by a TM. Reservation by a TM gives it the desired priority over OM's.
4. The other OM must not be working with the matrix or if the other OM is in trouble the check is disabled.
5. A test CFS for the matrix is present or a CFS from the matrix is true and it is OK to assign a matrix.

The access circuitry to perform this conditioning, consists of gates 11 through 14 for access circuit MA1. The CFS1 signal lead and the OK signal lead 37 are combined at "AND" gate 11. The output of gate 11 is connected to "OR" gate 12 along with a signal lead 20 indicating that a test call for matrix LPX1 is present. Gate 12 will respond by passing either signal to gate 14.

That marker OMB is not working with matrix LPX1 or that the check of OMB is not to be made is determined by "OR" gate 13 from the inputs 31 and 30 there connected. The other conditions necessary for the assignment of matrix LPX1 by marker OMA are determined at "AND" gate 14. The leads connected to gate 14 are the scanner counter lead 16 indicating that this matrix is connected, the lead 32 indicating that this matrix LPX1 is not in use by any other marker and the lead 38 indicating that it is not reserved by a terminating marker, as well as the output leads of gates 12 and 13. Upon the proper coincidence of these signals at gate 14 an output is produced which is connected through "OR" gate 15 to the DC set input of FF1. Gate 15 has the outputs of all of the gates corresponding to gate 14 of the other access circuits connected to it. A signal from any one of the access circuits MA1 through MA10 will be passed to set flip-flop FF1. The set output of FF1 indicates that this marker has answered a call for service from some line group matrix. This set signal is combined with a particular scanner counter output lead at gates such as 21 and 22 to indicate the particular line group matrix with which this marker is associated and accordingly marked busy to the other marker. This marking busy of only a single line group at a time, leaves the other line groups available to be serviced by the other marker during this marker's association with a particular line group. Thus the two markers may both be processing calls for service simultaneously, limited only in when they may answer a call for service by the allotter. The setting of FF1 blocks the passage of the OK to assign signal by its reset output connected to the input of gate 23. The enabling output from gate 19 will continue to be presented to gate 23 during the allotted times, but will have no effect until this marker is available to service another call. This will be indicated by FF1 being reset.

The "OK to assign a matrix" signal requires that the marker is (a) idle, (b) on line, (c) a matrix has not been assigned, (d) a message is not being received from the data processor, (e) a test call is not being processed, and (f) the interlock indicates that it is this marker's time to service a call.

The interlock to prevent simultaneous matrix assignment to two markers consists of a modified ring counter having two flip-flops in each marker. The flip-flops in a given marker run off that marker's clock. The clocks are not synchronized, but have approximately the same clock rate.

This interlock evolves from a shift register which is a circuit having many cascaded stages arranged so that an output terminal from each stage is connected to an input terminal of the next succeeding stage. The operation of a typical shift register is characterized by a propagation of an "on" (or "off") condition along the chain. Thus, at any given time, a stage standing in an "on" condition prepares the next succeeding stage for operation. Upon the receipt of an input signal the prepared stage turns "on," and the next succeeding stage is prepared. Hence, each input signal causes the "on" (or "off") condition to be propagated one stage or step along the chain.

The number of stages in such a shift register is determined by the ultimate number of signals that are to be counted or registered in a particular application. The number of signals that can be counted by a particular number of stages can be increased by a factor of two, if the output terminal signal of the last stage is inverted and brought around to the input terminal of the first stage. This creates an endless ring, with the count registered therein, expressed in a code determined from the operated states of the particular stages. A counter of this type is described by R. K. Richards in Chapter 9 of the book "-Digital Computer Components and Circuits," Van Nostrand, 1959.

In the present application this counter is adapted, and altered to be operated by the marker subsystem timing signals. It is further modified in that the timing signals that are to be counted are taken from two asynchronous sources, with each source driving one-half of the register stages. By further providing two decoders, one for the first two stages and one for the second two stages and arranging the decoders to produce an output only when the two associated stages are in different states.

Returning to FIG. 1, the principal elements of the interlock circuit are; the four flip-flops I1 and I2 in marker OMA, and I3 and I4 in marker OMB; and the decoding gates 17, 18, and 19 in marker OMA and 27, 28, and 29 in marker OMB. The flip-flops as used here are of the J-K type, that is flip-flops which have no indeterminate state and that one will always undergo a change in the conductive state, even upon the simultaneous application of signals to both the set and reset inputs.

Figure 2:
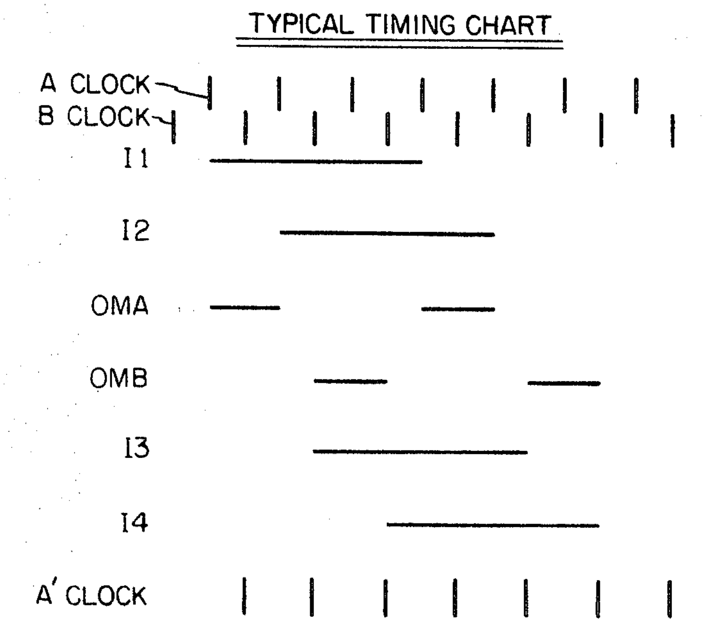
FIG. 2 is a timing chart showing the relative periods of the flip-flops and the timing pulses.
Figure 3:
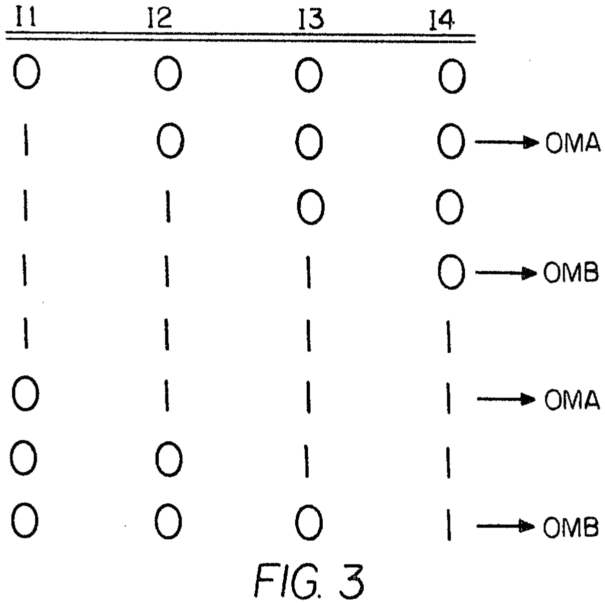
FIG. 3 is a table showing the sequential operated states of the interlock flip-flops and the stages during which the respective markers are enabled.

Flip-flops I1 and I2 are driven by clock pulse A on lead 33 of marker OMA. Also, connected to both flip-flops in each marker is a reset lead 39 for use by maintenance personnel. The set output of flip-flops I1, I2, and I3 are directly connected to the set inputs of flip-flops I2, I3, and I4, the set output of I4 is connected to the reset input of I1 while the reset output of I4 is connected to the set input of I1. The reset outputs of I1, I2, and I3 are connected to the reset inputs of I2, I3, and I4. Assuming that all of the flip-flops are in the reset state, the first clock pulse from the marker OMA clock A will set flip-flop I1, which upon being set prepares I2 for setting on the succeeding clock pulse. After I2 is set, I3 is prepared for setting, but it will be set by the clock pulse from marker OMB's clock A which may not follow at precisely the same interval that the pulse in marker OMA's clock would have had. This possible difference is illustrated in FIG. 2, where the clock pulse intervals of the two markers are shown staggered relative to each other. Upon the occurrence of the first clock pulse A in marker OMB after the setting of I2, I3 is set and prepares flip-flop I4 which is set on the succeeding clock pulse. At this stage flip-flops I1 through I4 are all set. Therefore, because of the inversion of the outputs of I4 to the inputs of I1, I1 is reset during the succeeding clock pulse in marker OMA. This reset state will now be propagated until I4 is reset. After I4 is reset the inversion of the chain to I1 again sets I1 and the same sequence is continued. The operating interval of the flip-flops and their relationship to the clock is graphically shown in FIG. 2 while the table in FIG. 3 symbolically shows the set "1" and reset "0" states of the flip-flops and the positions at which each marker is enabled. The periods when each marker is enabled are determined from the states of the flip-flops as decoded by gates 17, 18, and 19 in marker OMA or corresponding gates 27, 28, and 29 in marker OMB. The set output of I1 and the reset output of I2 are combined at "AND" gate 17, and the reset output of I1 and the set output of I2 are combined at "AND" gate 18. Gate 17 will produce an output when I1 is set and I2 is reset, while gate 18 will produce an output when I1 is reset and I2 is set. Either of these conditions are proper, so the output signals of gates 17 and 18 are taken to "OR" gate 19 where the presence of either signal will cause a signal to pass through to the input of gate 23. At gate 23 the existence of all of the conditions, *a* through *f*, enumerated above are confirmed by the generation of an output that is the "OK to assign matrix" signal on lead 37.

The interlock is a system of signalling between the two originating markers such that the interlock OK signal never appears in both markers at the same time. This is true even if the clocks in the two markers are running at slightly different rates. If the interlock signal were not used, it would be possible for both originating markers to assign themselves to the same call for service. The two originating markers would interfere with each other and one or both of them would fail, and go into a trouble state.

If items 1—5 are all true the assign matrix signal will come true. When a B clock pulse arrives it will set the matrix assigned flip-flop FF1. When a matrix is assigned it stops the advance of the matrix scanner counter. The output of the scanner counter is "AND" gated at a gate such as 21 for LPX1 with the output of the matrix assigned flip-flop FF1 to indicate that it is now in use by a marker.

From the foregoing, it will be apparent that applicant's arrangement: of an interlocked allotter consisting of a shift register type interval counter with one-half of the stages driven by one marker clock system and the other half of the stages driven by another marker clock system, along with the use of individual access circuits within the marker to service the line subgroups, provides a novel and extremely efficient use of the markers with no loss of time for the markers due to being allotted during an incomplete clock interval, while effectively preventing racing of the two markers to respond to a call for service during low traffic periods and greatly increasing the traffic-handling capabilities of the system by permitting an overlap of the marker operations within the matrix.

Various changes and alternative implementations will now occur to those skilled in the art without departing from the true spirit and scope of the invention.

What I claim Is:

1. An allotter comprising first equipment including a first source of timing pulses and second equipment including a second source of timing pulses, an endless cascade of four bistable switching stages with the signal obtained at the fourth stage inverted at the connection to the first stage, the first two of said four switching stages driven from said first timing pulse source and the second two of said four switching stages driven from said second timing pulse source, a decoding circuit connected to the outputs of said first two bistable switching stages operated to produce an output upon each of said first two stages being in a different stable state, to thereby enable said first equipment.

2. An allotter as claimed in claim 1 including a second decoding circuit connected to the outputs of said second two bistable switching stages operated to produce an output upon each of said second two stages being in a different stable state to thereby enable said second equipment.

3. A communication switching system including a switching matrix and a first and a second marker each responsive to calls for service from said matrix, each having a source of timing pulses and including an interlock comprising: an endless cascade of four bistable switching stages with the signal obtained at the fourth stage inverted at the connection to the first stage, the first two of said four switching stages driven from said first marker timing pulse source and the second two of said four switching stages driven from said second marker timing pulse source, a first decoding circuit connected to the outputs of said first two bistable switching stages operated to produce an output upon each of said first two stages being in a different stable state, to thereby enable said first marker, and a second decoding circuit connected to the outputs of said second two bistable switching stages operated to produce an output upon each of said second two stages being in a different stable state to thereby enable said second marker.

4. A communications switching system as claimed in claim 3 wherein the primary stage of said switching matrix is divided into a plurality of line subgroups, including individual call for service leads per subgroup, with each said marker including a corresponding plurality of access circuits, and means connecting said access circuits to corresponding call for service leads.

5. A communications switching system as claimed in claim 4 wherein each said marker includes means to mark only one particular one of said subgroups busy to said other marker during its association therewith, whereby the other subgroups may be accessed by another marker.